(12) United States Patent
Usui

(10) Patent No.: US 8,223,703 B2
(45) Date of Patent: Jul. 17, 2012

(54) SCHEDULING METHOD AND COMMUNICATION APPARATUS

(75) Inventor: Tsutomu Usui, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 911 days.

(21) Appl. No.: 12/282,886

(22) PCT Filed: May 26, 2006

(86) PCT No.: PCT/JP2006/310587
§ 371 (c)(1),
(2), (4) Date: Sep. 15, 2008

(87) PCT Pub. No.: WO2007/138664
PCT Pub. Date: Dec. 6, 2007

(65) Prior Publication Data
US 2009/0129329 A1    May 21, 2009

(51) Int. Cl.
*H04W 4/00* (2009.01)
*H04J 3/16* (2006.01)
*H04J 11/00* (2006.01)

(52) U.S. Cl. .................... 370/329; 370/208; 370/468

(58) Field of Classification Search .................. 370/203, 370/410, 208, 209, 210, 329, 328, 341, 344, 370/241, 216, 218; 455/464, 443, 444, 450, 455/455, 436, 134, 524, 525, 516, 452.1
See application file for complete search history.

(56) References Cited

U.S. PATENT DOCUMENTS

| 6,751,444 | B1 * | 6/2004 | Meiyappan | 455/69 |
| 7,016,319 | B2 | 3/2006 | Baum et al. | |
| 7,423,991 | B2 * | 9/2008 | Cho et al. | 370/329 |
| 7,471,621 | B2 * | 12/2008 | Chen et al. | 370/208 |
| 7,573,851 | B2 * | 8/2009 | Xing et al. | 370/334 |
| 7,711,386 | B2 * | 5/2010 | Sung et al. | 455/522 |
| 7,782,816 | B2 * | 8/2010 | Cho et al. | 370/329 |
| 8,005,479 | B2 * | 8/2011 | Meiyappan | 455/450 |

(Continued)

FOREIGN PATENT DOCUMENTS

EP    1 575 318 A2    9/2005

(Continued)

OTHER PUBLICATIONS

Japanese Office Action issued Nov. 9, 2010, in Patent Application No. 2008-517727 (with English-language translation).

(Continued)

*Primary Examiner* — Hanh Nguyen
(74) *Attorney, Agent, or Firm* — Oblon, Spivak, McClelland, Maier & Neustadt, L.L.P.

(57) ABSTRACT

A scheduling method in which a communication apparatus communicates data with a plurality of users by preferentially allocating a data sequence to a default subchannel segment that is different from another-cell allocation subchannel segment. As many data sequences as can be allocated to the default subchannel segment are selected and the selected data sequences allocated to the default subchannel segment. In downlink scheduling, the data sequences are selected in order from a data sequence subjected to a maximum level of interference from an adjacent base station. In uplink scheduling, the data sequences are selected in order from a data sequence that causes a maximum level of interference to the adjacent base station because of data communication. A data sequence not allocated to the default subchannel segment is allocated to the other-cell allocation subchannel segment when allocation of all the data sequences to the default subchannel segment fails.

10 Claims, 12 Drawing Sheets

U.S. PATENT DOCUMENTS

| | | |
|---|---|---|
| 2002/0119781 A1 | 8/2002 | Li et al. |
| 2002/0147017 A1 | 10/2002 | Li et al. |
| 2003/0123425 A1 | 7/2003 | Walton et al. |
| 2003/0169681 A1 | 9/2003 | Li et al. |
| 2004/0190482 A1 | 9/2004 | Baum et al. |
| 2005/0048979 A1 | 3/2005 | Chun et al. |
| 2005/0096061 A1 | 5/2005 | Ji et al. |
| 2005/0096062 A1 | 5/2005 | Ji et al. |
| 2005/0220002 A1 | 10/2005 | Li et al. |
| 2006/0009228 A1 | 1/2006 | Kang et al. |
| 2006/0135164 A1 | 6/2006 | Kim et al. |
| 2007/0202904 A1 | 8/2007 | Cheng et al. |
| 2008/0253319 A1 | 10/2008 | Ji et al. |

FOREIGN PATENT DOCUMENTS

| | | |
|---|---|---|
| EP | 1 657 945 A2 | 5/2006 |
| JP | 2005 80286 | 3/2005 |
| JP | 2006 5946 | 1/2006 |
| JP | 2006 14321 | 1/2006 |
| JP | 2007-510369 | 4/2007 |
| WO | 2002 49385 | 6/2002 |
| WO | WO 02/49385 A2 | 6/2002 |
| WO | 2004 086636 | 10/2004 |
| WO | WO 2005/043948 A2 | 5/2005 |
| WO | WO 2005/046283 A1 | 5/2005 |
| WO | WO 2005/089006 A1 | 9/2005 |

OTHER PUBLICATIONS

"Part 16: Air Interface for fixed Broadband Wireless Access Systems", IEEE std 802.16, pp. 551-576, (2004).

Extended European Search Report issued Mar. 30, 2012 in European Patent Application No. 06 74 6916.3.

Samsung: "Flexible Fractional Frequency Reuse Approach", 3GPP Draft; R1-051341, $3^{rd}$ Generation Partnership Project (3GPP), Mobile Competence Centre; 650, Route des Lucioles; F-06921 Sophia-Antipolis Cedex; France, vol. RAN WG1, No. Seoul, Korea; Nov. 1, 2005, XP050100938, [retrieved on Nov. 1, 2005] *Sections 1, 2* *figure 1*.

LG Electronics: "Interference mitigation in evolved UTRA/UTRAN", 3GPP Draft; R1-050833_DL Interference Mitigation, $3^{rd}$ Generation Partnership Project (3GPP), Mobile Competence Centre; 650, Route des Lucioles; F-06921 Sophia-Antipolis Cedex; France, vol. RAN WG1, No. London, UK; Aug. 24, 2005, XP050100463, [retrieved on Aug. 24, 2005] *Sections 1, 2.1, 2.2* *figures 2a, 2b, 2c*.

* cited by examiner

SCHEDULING METHOD AND COMMUNICATION APPARATUS

TECHNICAL FIELD

The present invention relates to a scheduling method used when performing data communication in an OFDMA (Orthogonal Frequency Division Multiple Access)-based wireless communication system, and more particularly, to a scheduling method and a communication apparatus that are capable of preventing occurrence of interferences between adjacent cells and realizing high throughput.

BACKGROUND ART

Non Patent Document 1 described below provides specifications of an OFDMA-based wireless communication system. In the OFDMA-based wireless communication system described in the Non Patent Document 1, a base station divides a frequency band that has been allocated to the base station into a plurality of subchannels and performs communications with terminals in its area (cell) by using those subchannels.

A wireless communication system is considered below that employs PUSC (Partial Usage of SubChannels) specified in the Non Patent Document 1 as a method of dividing a frequency band into subchannels and contains cells each having a single segment structure. Such a wireless communication system allocates a frequency band to each cell such that the subchannels used in adjacent cells are different from one another as shown for example in FIG. 1-1. Concretely, subchannels are allocated to cells X, Y, and Z in a manner as shown in FIG. 1-2.

Non Patent Document 1: "IEEE std 802. 16-2004", p. 551 to 576

DISCLOSURE OF INVENTION

Problem to be Solved by the Invention

When PUSC is used in the OFDMA system, communication is performed by randomly allocating subchannels to cells as shown in FIG. 1-2. Therefore, a subchannel that is in use in other cells (adjacent cells) may be allocated for communications to a terminal located at the cell boundary and lead to occurrence of interference. This problem can be resolved by setting subcarriers forming subchannels to be the same for all cells and causing the cells to use different subchannels respectively upon performing communications. However, with the above solution, because the number of subchannels that can be used in each cell become limited, it is difficult to realize high average throughput.

The present invention has been made to solve the above problems in the conventional technology and it is an object of the present invention to provide a scheduling method and a communication apparatus that are capable of suppressing effects of other-cell interference and improving average throughput in the OFDMA system that uses PUSC for subchannel division and contains cells each having a single segment structure.

Means for Solving Problem

To solve the above problems and to achieve the objects, the present invention provides a scheduling method in which a communication apparatus belonging to an OFDMA (Orthogonal Frequency Division Multiple Access)-based wireless communication system communicates data with a plurality of users (terminals) by preferentially allocating a data sequence to a default subchannel segment that is different from a subchannel segment (other-cell allocation subchannel segment) that is preferentially used for data communication by another communication terminal in an adjacent cell. The scheduling method includes a data sequence selection-allocation step including selecting as many data sequences as can be allocated to the default subchannel segment and allocating (scheduling) selected data sequences to the default subchannel segment, wherein in downlink scheduling, the data sequence selection-allocation step including selecting the data sequences in order from a data sequence subjected to a maximum level of interference from an adjacent other base station (adjacent base station), and in uplink scheduling, the data sequence selection-allocation step including selecting the data sequences in order from a data sequence that causes a maximum level of interference to the adjacent base station because of data communication; and a remaining data sequence allocation step including allocating a data sequence that has not allocated to the default subchannel segment to the other-cell allocation subchannel segment when allocation of all the data sequences to the default subchannel segment fails.

Effect of the Invention

According to an aspect of the present invention, when large amount of data is to be communicated and it is difficult to communicate the data using subchannels in pre-allocated segments, subchannels in segments allocated to other cells are additionally used. Furthermore, upon allocating data to the subchannels in each segment, the subchannels to be allocated for the data are determined based on transmit power density of each data. Therefore, it is possible to suppress effects of other-cell interference and improve average throughput.

BRIEF DESCRIPTION OF DRAWINGS

FIG. 1-2 is a diagram of an example of subchannels allocated to each cell in the wireless communication system.

FIG. 2 is a diagram of a configuration example of a wireless communication system that employs a scheduling method according to the present invention.

FIG. 10-1 is a diagram of an exemplary cell arrangement in a wireless communication system.

FIG. 10-2 is a diagram of an example of subchannels allocated to each cell and used for uplink data transmission in the wireless communication system.

Figure 1:
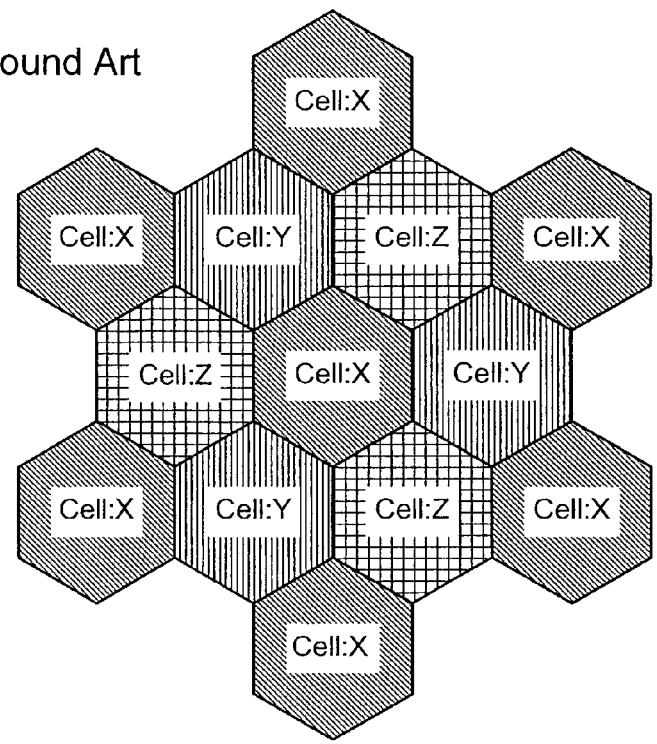
FIG. 1-1 is a diagram of an exemplary cell arrangement in a wireless communication system.

EXPLANATIONS OF LETTERS OR NUMERALS 1, 70, 80 base station
2, 3, 71, 72, 73, 74, 81, 82 terminal
10 data generating unit
11 randomizing unit
12 encoding unit
13 interleaving unit
14 modulating unit
15 mapping unit
16 IFFT unit
17 GI adding unit
18 scheduling unit
20 GI deleting unit
21 FFT unit
22 detection unit
23 demapping unit
24 demodulating unit
25 deinterleaving unit
26 decoding unit
27 derandomizing unit
30 antenna

BEST MODE(S) FOR CARRYING OUT THE INVENTION

Exemplary embodiments of a scheduling method and a communication apparatus according to the present invention are explained in detail below with reference to the accompanying drawings. The present invention is not limited to the following embodiments.

First Embodiment

Figures 1, 2:
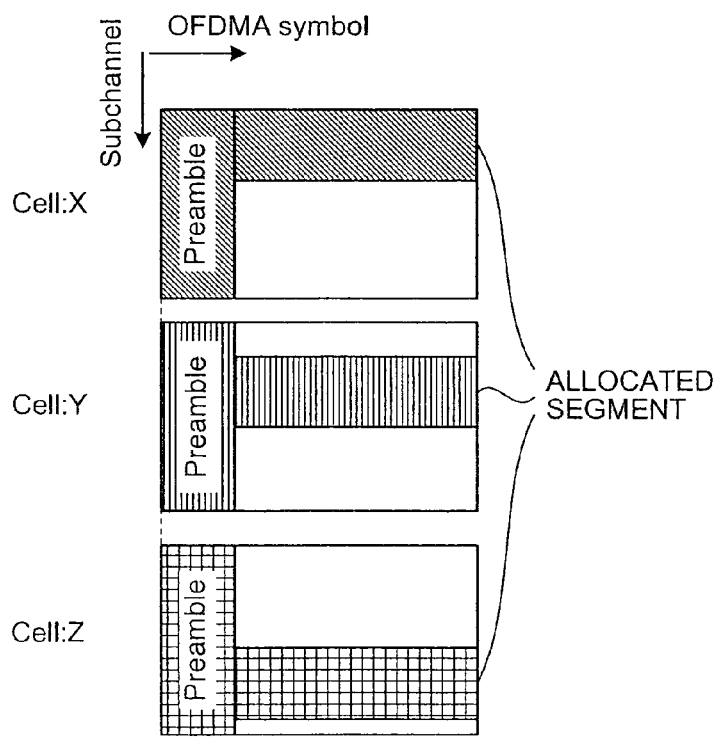
Figure 2:
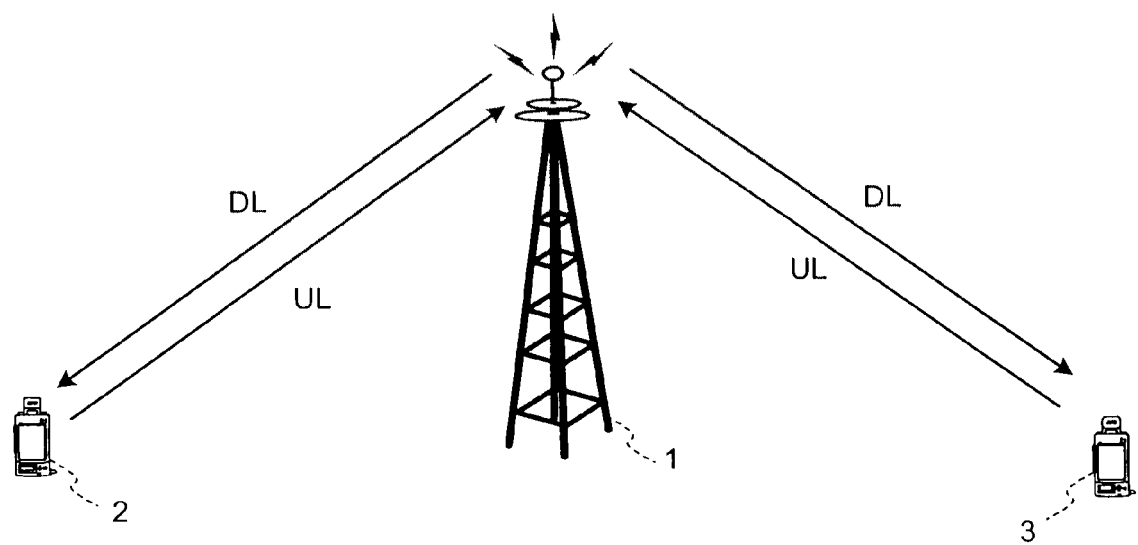

FIG. 2 is a diagram of a configuration example of a wireless communication system that employs a scheduling method according to a first embodiment of the present invention. The wireless communication system includes a base station 1 and terminals 2 and 3. The base station 1 transmits downlink data (data or control information transmitted to each terminal) to the terminals 2 and 3 through DL (Down Link) and receives uplink data (data or control information transmitted from each terminal) from the terminals 2 and 3 through UL (Up Link).

Figure 3:
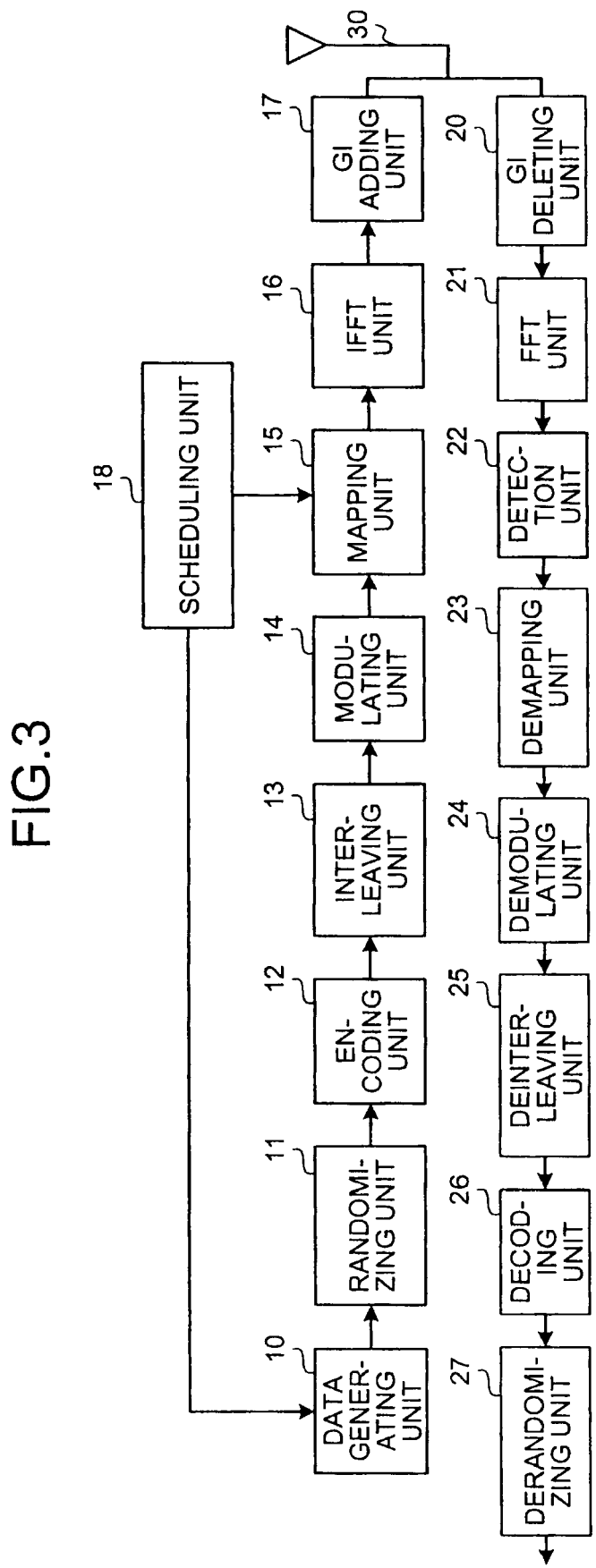
FIG. 3 is a diagram of a configuration example of a base station.

FIG. 3 is a diagram of a configuration example of the base station 1. The base station 1 includes units that perform transmission processing on downlink data, such as a data generating unit 10, a randomizing unit 11, an encoding unit 12, an interleaving unit 13, a modulating unit 14, a mapping unit 15, an IFFT (Inverse Fast Fourier Transform) unit 16, a GI (Guard Interval) adding unit 17, and a scheduling unit 18. The base station 1 further includes units that perform reception processing on uplink data, such as a GI deleting unit 20, an FFT (Fast Fourier Transform) unit 21, a detection unit 22, a demapping unit 23, a demodulating unit 24, a deinterleaving unit 25, a decoding unit 26, a derandomizing unit 27. The base station 1 also includes an antenna 30 for transmitting downlink data and receiving uplink data. The scheduling unit 18 corresponds to both a first scheduling unit and a second scheduling unit. Processing of transmitting downlink data and receiving uplink data performed by the base station 1 is described below with reference to FIG. 3.

The processing of transmitting downlink data is described below first. The data generating unit 10 generates downlink data based on a subchannel structure, an OFDMA symbol for allocating bursts, and a subchannel that are determined by the scheduling unit 18. The randomizing unit 11 randomizes the downlink data and the encoding unit 12 encodes the randomized downlink data. The interleaving unit 13 interleaves the encoded downlink data and the modulating unit 14 modulates the interleaved downlink data thereby generating modulated data. The mapping unit 15 performs mapping of each downlink data to the OFDMA symbol and the subchannel determined by the scheduling unit 18, and outputs the result to the IFFT unit 16. Operations of the scheduling unit 18 will be described in detail later. The data output from the mapping unit 15 is subjected to IFFT (Inverse Fast Fourier Transform) by the IFFT unit 16. The GI adding unit 17 adds guard interval to the data and transmits the data to terminals via the antenna 30.

The processing of receiving uplink data is described below now. The GI deleting unit 20 deletes guard interval from uplink data received via the antenna 30. The uplink data is then subjected to FFT (Fast Fourier Transform) by the FFT unit 21 and detection processing by the detection unit 22. The demapping unit 23 extracts each uplink data (uplink data received from each user) from data output from the detection unit 22. The demodulating unit 24 demodulates extracted data, the deinterleaving unit 25 deinterleaves demodulated data, the decoding unit 26 decodes deinterleaved data, and the derandomizing unit 27 derandomizes decoded data.

The terminals have the same configurations as that of the base station 1. The terminals transmit uplink data to the base station 1 by performing the above-explained data transmission processing and receive downlink data from the base station 1 by performing the above-explained data reception processing. However, mapping units of the terminals perform mapping based on a scheduling result of symbols used for uplink data transmission and prespecified by the base station 1. That is, the mapping units of all the terminals controlled by the one base station perform mapping of uplink data to be transmitted based on a scheduling result of uplink subchannels and symbols contained in downlink frames received from the base station.

A data allocation method (a scheduling method performed by the scheduling unit 18) performed when the base station 1 transmits downlink data to a plurality of terminals in an OFDMA-based wireless communication system is described below. A structure of each cell is similar to that shown in FIG. 1-1 (each cell has a single segment structure for DL) and PUSC is used. Furthermore, it is assumed that "Use all SC indicator" is "0". The "Use all SC indicator" is one of the system parameters preset in the system and determines the structure of each cell.

Figure 4:
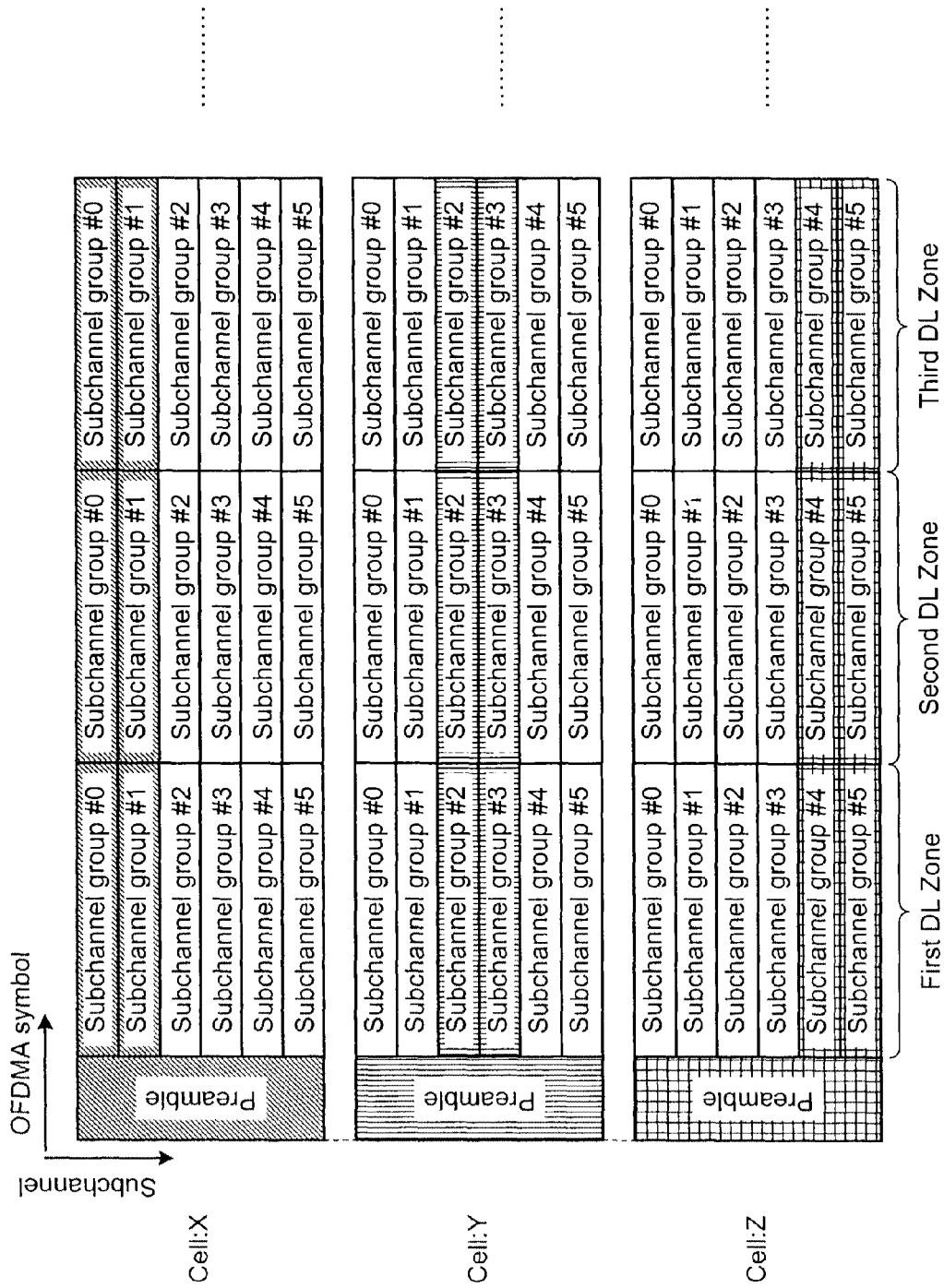
FIG. 4 is a diagram for explaining a scheduling method according to a first embodiment.

In the system using PUSC, a subchannel is divided into six subchannel groups #0, #1, #2, #3, #4, and #5. In the present embodiment, as shown in FIG. 4, it is assumed that the subchannel groups #0 and #1 are pre-allocated to a cell X, the subchannel groups #2 and #3 are pre-allocated to a cell Y, and the subchannel groups #4 and #5 are pre-allocated to a cell Z, as default subchannel groups. Upon performing scheduling of a plurality of pieces of downlink data, each of the cells basically allocates the downlink data within the default subchannel groups allocated with respect to each cell. That is, each of the cells transmits downlink data by preferentially using the default subchannel groups allocated to it over the other subchannel groups.

In PUSC of DL, if the "Use all SC indicator", which is one of system parameters, is "0" (in a wireless communication system with "Use all SC indicator=0"), subcarriers of each of the subchannel groups will be the same in all DL zones. Therefore, as long as downlink data is allocated within the default subchannel groups upon transmission, interference to other cells does not occur.

A scheduling operation for transmitting downlink data performed by a base station in the cell X is described below as an example. In the cell X, the base station 1 (i.e., the scheduling unit 18 of the base station 1) selects, from among data such as FCH (Frame Control Header) to be allocated to the first DL zone and DL-MAP (hereinafter, collectively referred to as "downlink data" as appropriate), as much downlink data as can be allocated to the allocated segment shown in FIG. 4 (the subchannel groups #0 and #1 in a first DL zone and allocated as default subchannel groups in the cell X) based on transmit power density. Specifically, as much downlink data as can be allocated to the allocated segment are sequentially selected such that the downlink data to be transmitted at the highest transmit power density is the most prioritized. Then, selected downlink data is allocated (scheduled) to the allocated segment shown in FIG. 4.

When the amount of the downlink data to be allocated to the allocated segment shown in FIG. 4 exceeds an available space of the allocated segment (when all the downlink data cannot be allocated to the allocated segment shown in FIG. 4), all the downlink data is allocated to the first DL zone by performing one of the following processes.

Figure 5:
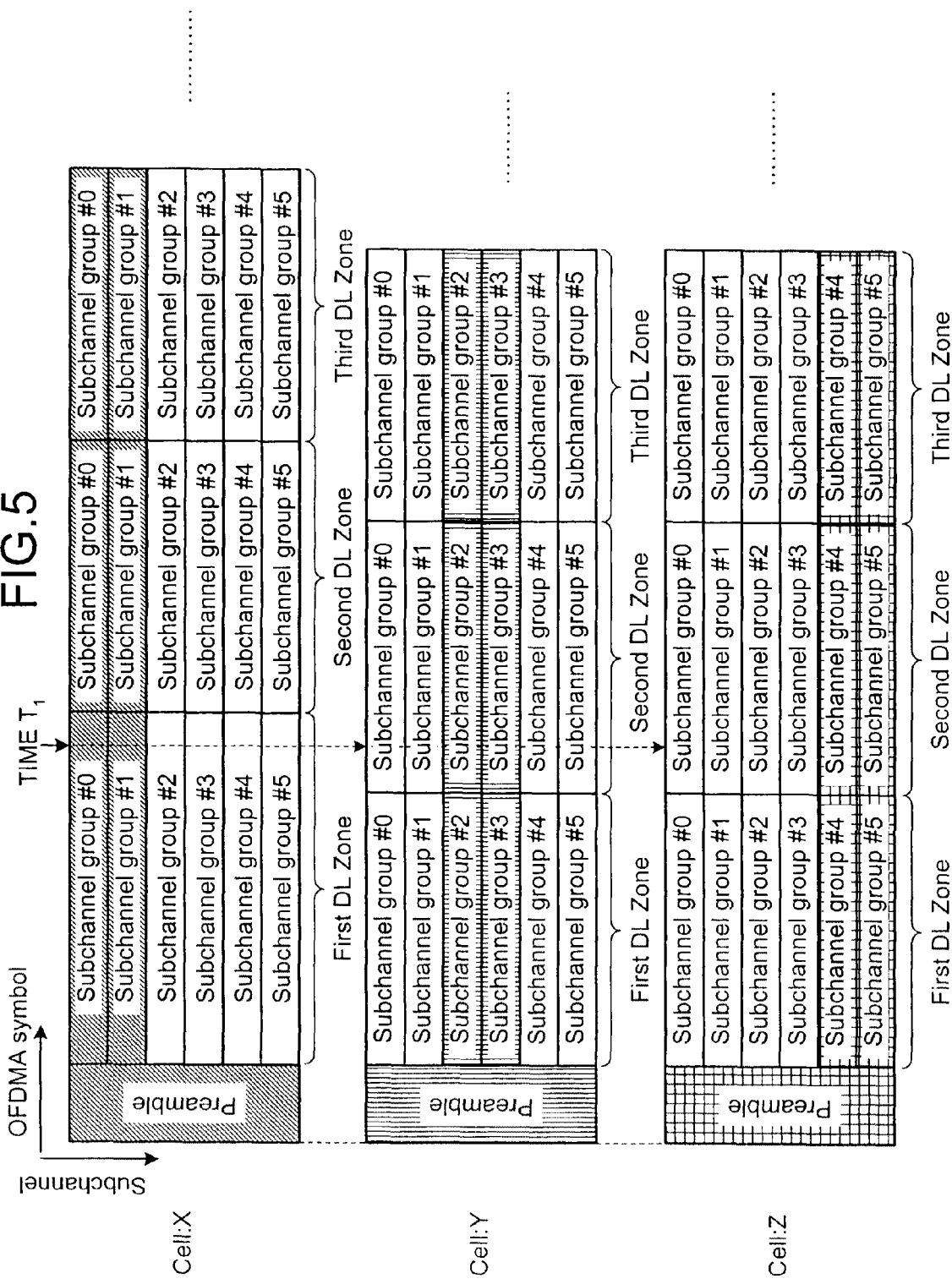
FIG. 5 is a diagram for explaining the scheduling method according to the first embodiment.

The first method is, as shown in FIG. 5, that the base station in the cell X extends the first DL zone in an OFDMA symbol direction so that all the downlink data can be allocated to a single frame. Then, all the downlink data is allocated to an extended DL zone. Concretely, an OFDMA symbol at time T, in FIG. 5 is within the first DL zone in the own cell (cell X) while within second DL zones in other cells (cell Y and cell Z). However, as described above, because the subcarriers forming each of the subchannels are the same in all the DL zones, other-cell interference does not occur. When data cannot be stored in the default subchannel groups in other cells, first DL zones are extended in the similar manner.

Figure 6:
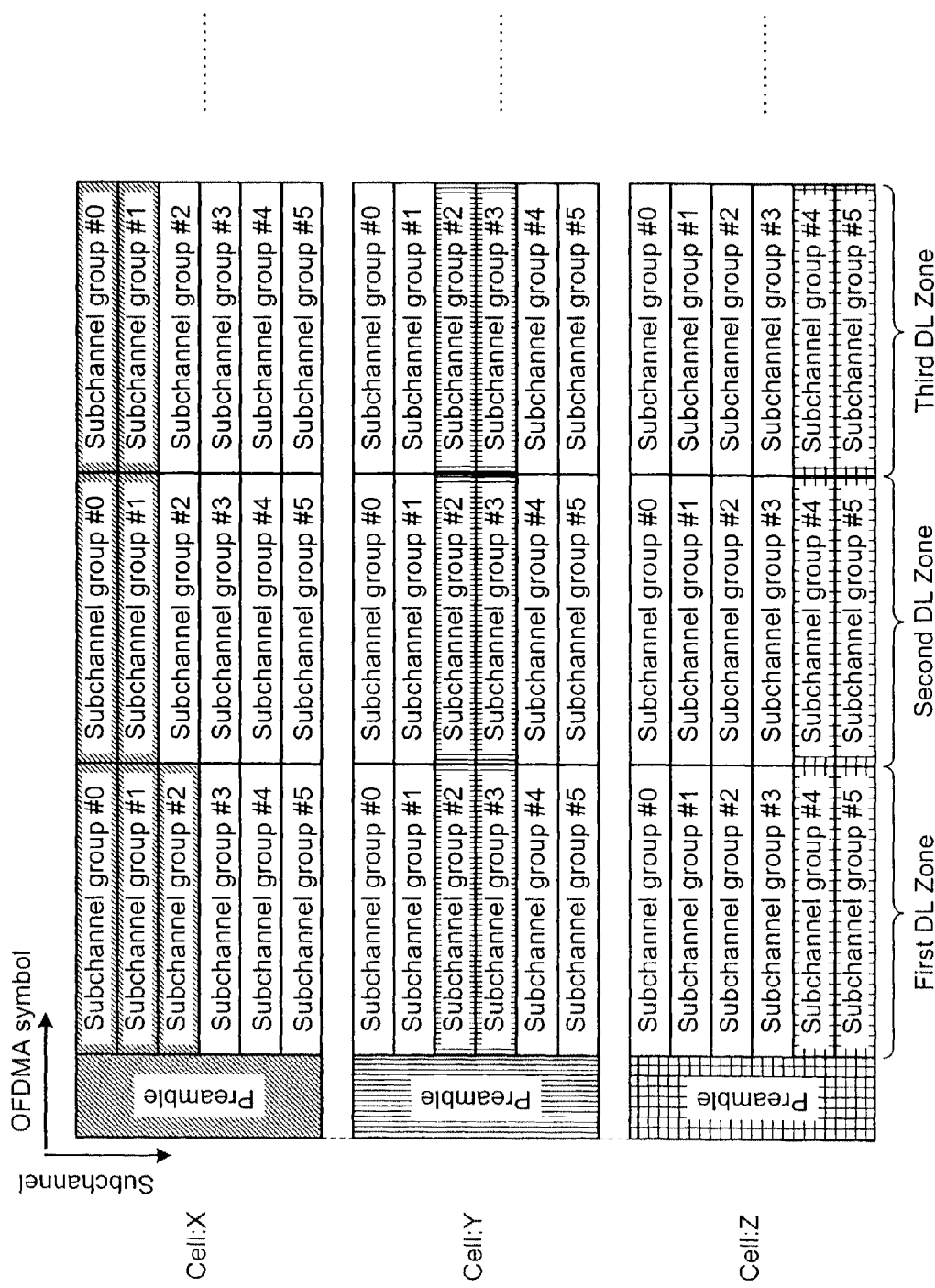
FIG. 6 is a diagram for explaining the scheduling method according to the first embodiment.

The second method is, as shown in FIG. 6, that the base station in the cell X adds a subchannel group so that all the downlink data can be allocated to the default subchannel groups and the added subchannel group. In the example shown in FIG. 6, the subchannel group #2 is added. That is, the subchannel group #2 allocated as the default subchannel group in the cell Y is set to be used in the cell X. Then, the base station in the cell X allocates all the downlink data to the default subchannel groups and the added subchannel group.

At this state, in the cell X, when the downlink data is allocated to the added subchannel group #2, the base station preferentially allocates the downlink data to be transmitted at low power density (e.g., downlink data to terminals near the base station and downlink data that can be demodulated at low reception power) in the subchannel group #2. Accordingly, the downlink data to be allocated to the subchannel group #2 in the cell X for transmission is attenuated by the time it propagates to the cell Y. That is, a subcarrier transmission using the subchannel group #2 in the cell X is attenuated to the appropriate level at which interference to a subcarrier using the subchannel group #2 in the cell Y (data subcarrier and pilot subcarrier) does not occur.

The base station in the cell X preferentially allocates the downlink data to be transmitted at high power density to the subchannel group #1. Thus, the base station classifies the downlink data into groups based on transmit power density so that the transmit power density of the downlink data to be transmitted by the subchannel groups satisfies the relationship of "(transmit power density of downlink data in the subchannel group #1)>(transmit power density of downlink data in the subchannel group #0)>(transmit power density of downlink data in the subchannel group #2)". Then, the groups containing the downlink data are allocated (scheduled) to different subchannel groups, respectively.

When the base station in the cell X adds and uses another subchannel group different from those allocated as the default subchannel groups in the own cell, even-numbered subchannel groups (the subchannel groups #2 and #4) are added as described above. Then, if the downlink data to be allocated cannot be stored even after all the even-numbered subchannel groups are added, odd-numbered subchannel groups (the subchannel groups #3 and #5) are further added. This is because the odd-numbered subchannel groups are used for allocating downlink data to terminals located at the cell boundary (terminals subjected to high-level interference from base stations in other cells). Furthermore, the base station in the cell X preferentially allocates downlink data with low transmit power density to the added subchannel groups to reduce an effect (interference) to other cells. More specifically, the base station in the cell X preferentially allocates downlink data with low transmit power density to the odd-numbered subchannel groups among the added subchannel groups.

In the above explanations, downlink data with high transmit power density are allocated to the odd-numbered subchannel groups, and when the subchannel groups are to be added, the even-numbered subchannel groups are primarily added. However, the above operations can be conducted in a reverse manner. That is, downlink data with high transmit power density can be allocated to the even-numbered subchannel groups, and when the subchannel groups are to be added, the odd-numbered subchannel groups can be primarily added. Furthermore, even in other cells, when all the downlink data cannot be stored in the default subchannel groups, the subchannel groups are added in the similar manner to transmit as much downlink data as possible. In the examples shown in FIGS. 4 and 5, the DL zones are not necessarily temporally synchronized with each other.

Even when the base station 1 (the scheduling unit 18 of the base station 1) in the cell X determines that all the downlink data can be stored in the allocated segment shown in FIG. 4, the base station 1 (the scheduling unit 18 of the base station 1) in the cell X preferentially allocates downlink data to be transmitted at high power density to the subchannel group #1. This is because, as described above, the odd-numbered subchannel groups are used for allocating downlink data to terminals located at the cell boundary (terminals subjected to high-level interference from base stations in other cells).

Thus, according to the embodiment, when downlink data cannot be transmitted only by the pre-allocated subchannel groups (when all the downlink data cannot be stored in a preset segment for allocating the downlink data), the base station extends the DL zone in the OFDMA symbol direction, or adds and uses the subchannel groups allocated to the other cells, to extend the segment for allocating the downlink data.

Furthermore, when the subchannel group allocated to the other cells is added and used, an allocation destination of the downlink data (the subchannel group for allocating the data) is determined based on the transmit power density of the downlink data. Therefore, it is possible to improve average throughput while effects of interference to other cells can be suppressed.

Furthermore, the base station in each of the cells is configured to autonomously perform an operation of extending the segment for allocating the downlink data with preset procedures (procedures based on transmit power density to terminals) when all the downlink data cannot be allocated. Therefore, it is not necessary to manage subchannels to be allocated between the base stations in a wireless communication system (it is not necessary to communicate control data between the base stations). Thus, it is possible to suppress interference to other cells and improve average throughput with easy procedures.

Second Embodiment

A scheduling method and a communication apparatus according to a second embodiment of the present invention are described below. Configurations and structures of the wireless communication system, cells, and base stations according to the second embodiment are the same as those of the first embodiment described above. Subchannel groups (default subchannel groups) pre-allocated to each cell are the same as those of the first embodiment. Therefore, in the second embodiment, only differences from the first embodiment are described.

In each cell, downlink data to terminals subjected to high-level interference (with low distance attenuation) from base stations in other cells, such as terminals located at the cell boundary, are allocated to odd-numbered subchannel groups. On the other hand, downlink data to terminals subjected to low-level interference from base stations in other cells, such as terminals located near a base station in the own cell, are allocated to even-numbered subchannel groups.

In the present embodiment, explanation is given about an operation performed by a base station when a plurality of pieces of downlink data to be allocated to second DL zones of the cell X are present and if all the downlink data cannot be stored in the allocated segments shown in FIG. 4 (the subchannel groups #0 and #1 that are the second DL zones and allocated as the default subchannel groups in the cell X).

Figure 7:
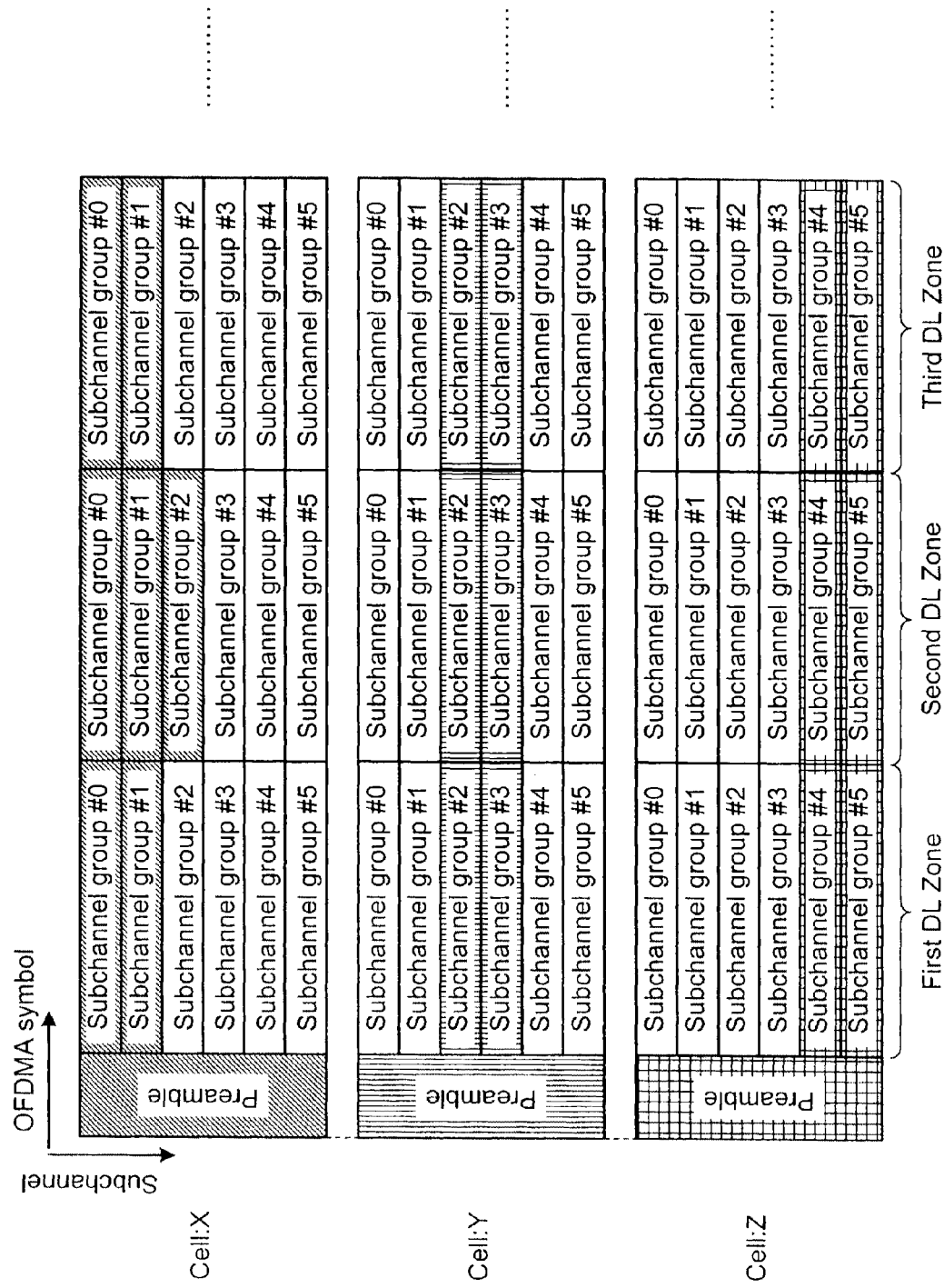
FIG. 7 is a diagram for explaining a scheduling method according to a second embodiment.

When a plurality of pieces of downlink data to be allocated to the second DL zones of the cell X are present, a subchannel group is added as shown in FIG. 7. In the example shown in FIG. 7, the subchannel group #2 is added. That is, the subchannel group #2 allocated as the default subchannel group in the cell Y is set to be used in the cell X.

At this state, if capacity is not sufficient even after the subchannel group #2 is added (if all the downlink data cannot be stored), another even-numbered subchannel group that has not been added (the subchannel group #4 in this example) is added. Furthermore, if capacity is still not sufficient, odd-numbered subchannel groups (the subchannel groups #3 and #5) are sequentially added. The reason for adding the subchannel groups in the above order is that downlink data to terminals subjected to high-level interference from base stations in other cells, such as terminals located at the cell boundary, are allocated to the odd-numbered subchannel groups.

For example, in the cell Y, downlink data to terminals subjected to high-level interference from base stations in other cells are allocated to the subchannel group #3. Therefore, if the subchannel group #3 is added in the cell X and when downlink data is allocated to the subchannel group #3 for transmission, terminals that communicate using the subchannel group #3 in the cell Y are subjected to high-level interference from the cell X (propagation attenuation is insufficient). On the other hand, if the subchannel group #2 that is the even-numbered subchannel group is added in the cell X and when downlink data is allocated to the subchannel group #2 for transmission, terminals that communicate using the subchannel group #3 in the cell Y are substantially free from interference from the cell X (effects of interference are reduced). The base station in the cell X preferentially allocates downlink data with low transmit power density to the added subchannel groups for suppressing interference to other cells.

Figure 8:
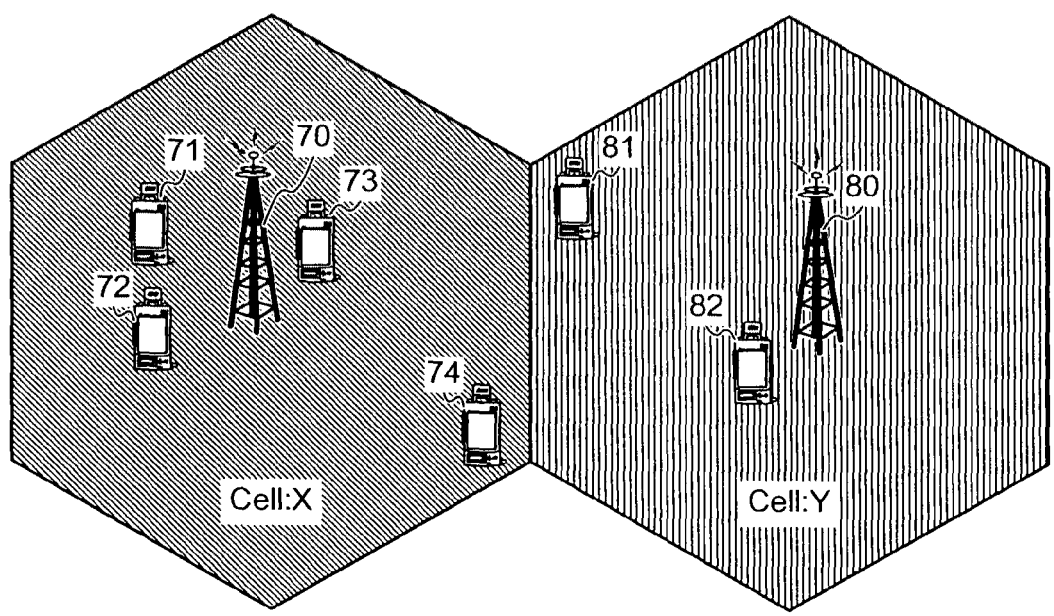
FIG. 8 is a diagram of an example of positional relationships between terminals located in two adjacent cells.
Figure 9:
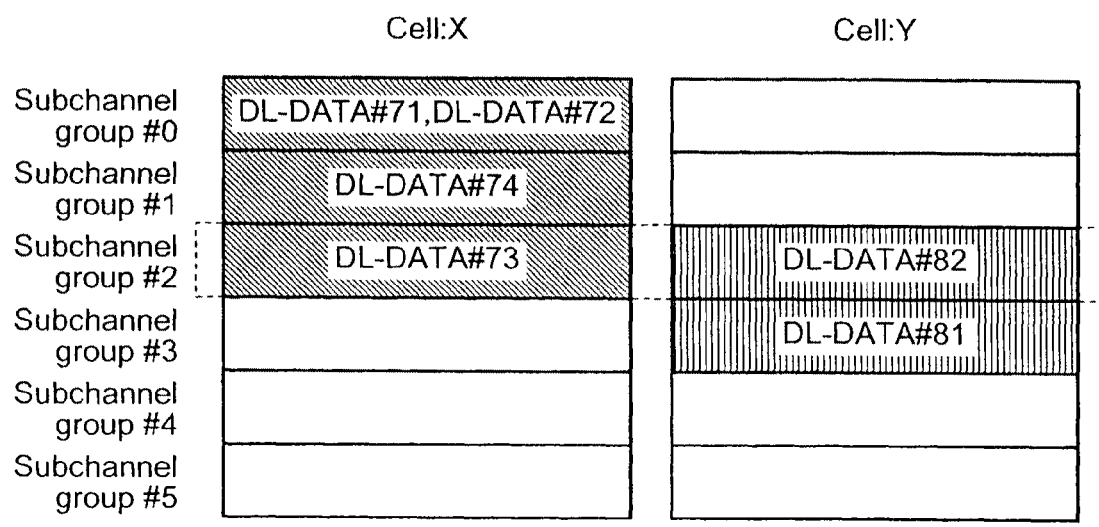
FIG. 9 is a diagram of an example of a result of scheduling obtained when the scheduling method according to the second embodiment is used.

Exemplary operations of scheduling downlink data based on the transmit power density are described below with reference to FIGS. 8 and 9. FIGS. 8 and 9 are diagrams for explaining examples of a scheduling operation performed in the cell X. FIG. 8 illustrates positional relationships between terminals located in the cell X and the cell Y. Specifically, in the cell X, a terminal 73 is nearest to a base station 70 and a terminal 74 is located at a boundary between the cell X and the cell Y. Furthermore, the terminals 71 and 72 are farther to the base station 70 than the terminal 73 while nearer to the base station 70 than the terminal 74. In the cell Y, a terminal 82 is nearest to a base station 80 while a terminal 81 is located at a boundary between the cell X and the cell Y. FIG. 9 is an example of a scheduling result in the cell X and the cell Y.

In the example shown in FIG. 8, the base station 70 (a scheduling unit of the base station 70) in the cell X allocates to the subchannel group #1 downlink data (DL-DATA #74) to be transmitted to the terminal 74 that is located at the cell boundary (at a boundary of the cell X). Then, the base station 70 allocates all the downlink data to be transmitted to terminal other than the terminal 74 to the remaining segments (remaining segments of the subchannel group #1 and the subchannel group #0). At this state, the base station 70 checks whether all the downlink data to be transmitted to the terminals other than the terminal 74 can be allocated to the remaining segments. If all the downlink data cannot be allocated, the base station 70 allocates to the subchannel group #2 downlink data (DL-DATA #73) to be transmitted to the terminal 73 at the lowest transmit power density. Then, the base station 70 allocates the rest of the downlink data (DL-DATA #71, DL-DATA #72) to the subchannel group #0.

If all the remaining downlink data cannot be allocated to the subchannel group #0 after the downlink data to the terminal 73 are allocated to the subchannel group #2, adjustment is conducted such that the downlink data to the terminal 73 at the second lowest transmit power density is allocated to the subchannel group #2 so that all the downlink data can be allocated to the subchannel groups.

Similarly, in the cell Y, the base station 80 allocates to the subchannel group #3 downlink data (DL-DATA #81) to be transmitted to the terminal 81 that is located at the cell boundary. Then, the base station 80 allocates to the subchannel group #2 downlink data (DL-DATA #82) to be transmitted to the terminal 82.

In this state, DL-DATA #73 transmitted from the base station 70 collides with DL-DATA #82 transmitted from the base station 80 (see FIG. 9). However, a signal (transmission signal to the terminal 82) received by the terminal 73 from the base station 80 is sufficiently weak due to propagation attenuation, so that the terminal 73 can precisely demodulate data transmitted from the base station 70 to the terminal 73. The terminal 82 experiences the same situation, i.e., the terminal 82 can precisely demodulate data transmitted from the base station 80 to the terminal 82.

When the base station in the cell X performs the scheduling by adding odd-numbered subchannel groups, the base station preferentially allocates downlink data with the lowest transmit power density to the odd-numbered subchannel groups (data to terminals near the base station and capable of demodulating the data at low transmit power are preferentially allocated). Then, downlink data with the lowest transmit power density among the remaining downlink data is preferentially allocated to the added even-numbered subchannel group.

In the above explanation, downlink data with high transmit power density are allocated to the odd-numbered subchannel groups, and when the subchannel groups are to be added, the even-numbered subchannel groups are primarily added. However, a reverse operation is also permissible. That is, downlink data with high transmit power density can be allocated to the even-numbered subchannel groups, and when the subchannel groups are to be added, the odd-numbered subchannel groups can be preferentially added. Furthermore, even in other cells, when all the downlink data cannot be stored in the default subchannel groups, the subchannel groups are added in the similar manner to transmit as much downlink data as possible. In the examples shown in FIG. 7, the DL zones are not necessarily temporally synchronized with each other.

Thus, according to the embodiment, when downlink data cannot be transmitted only by the pre-allocated subchannel groups (when all the downlink data cannot be stored in a preset segment for allocating the downlink data), the base station sequentially adds the subchannel groups allocated to the other cells to extend the segment for allocating the downlink data. Then, downlink data with low transmit power density is preferentially allocated to the added subchannel groups. Therefore, it is possible to improve average throughput while effects of interference to other cells can be suppressed.

Furthermore, the base station is configured to autonomously perform an operation of extending the segment for allocating the downlink data with preset procedures when all the downlink data cannot be allocated. Therefore, it is not necessary to manage subchannels to be allocated between the base stations in a system (it is not necessary to communicate control data between the base stations). Thus, it is possible to suppress interference to other cells and improve average throughput with easy procedures.

Third Embodiment

Figures 1, 10:
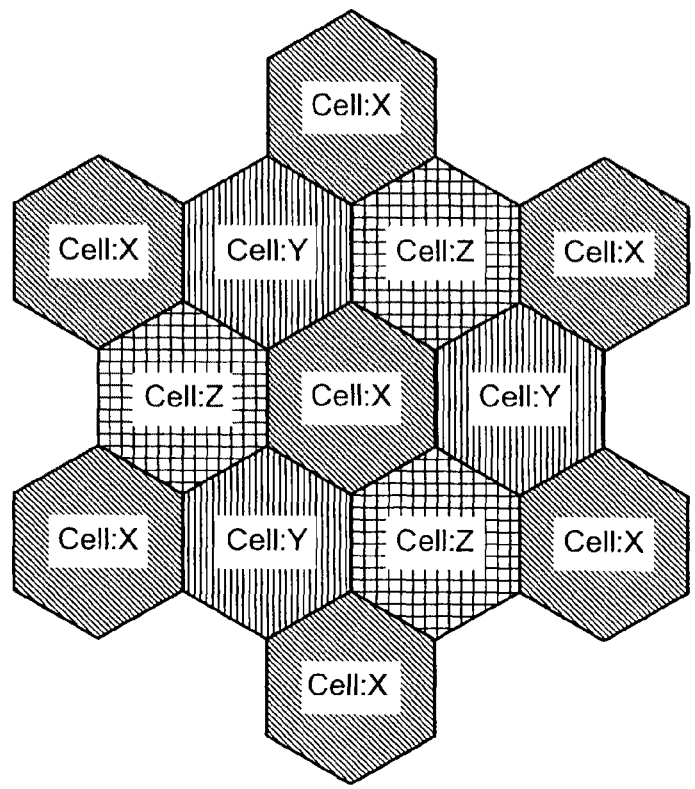
Figures 2, 10:
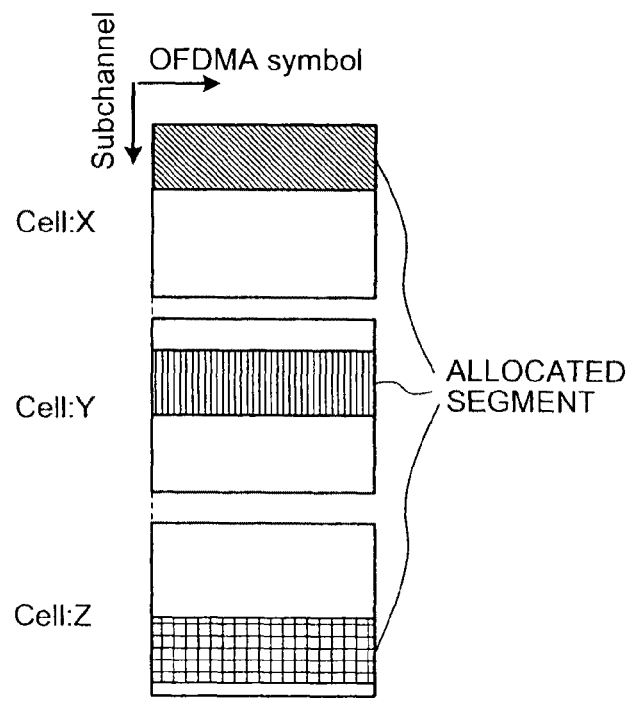

A scheduling method and a communication apparatus according to a third embodiment of the present invention are described below. A scheduling operation on uplink data transmitted from terminals to a base station is described in the third embodiment, which is different from the first and the second embodiments in which the scheduling operation is performed on the downlink data transmitted from the base station to the terminals. Configurations of the wireless communication system and base stations according to the third embodiments are the same as those described in the first embodiment. Structures of cells are those as described in FIG. 10-1 (each cell has a single segment structure for UL) and PUSC is used. FIG. 10-2 is an example of a result of allocation of a frequency band (subchannel) in each cell. Furthermore, "UL_PermBase" in the cells (a system parameter that indicates a structure of a subchannel allocated to each cell) are set to the same.

Figure 11:
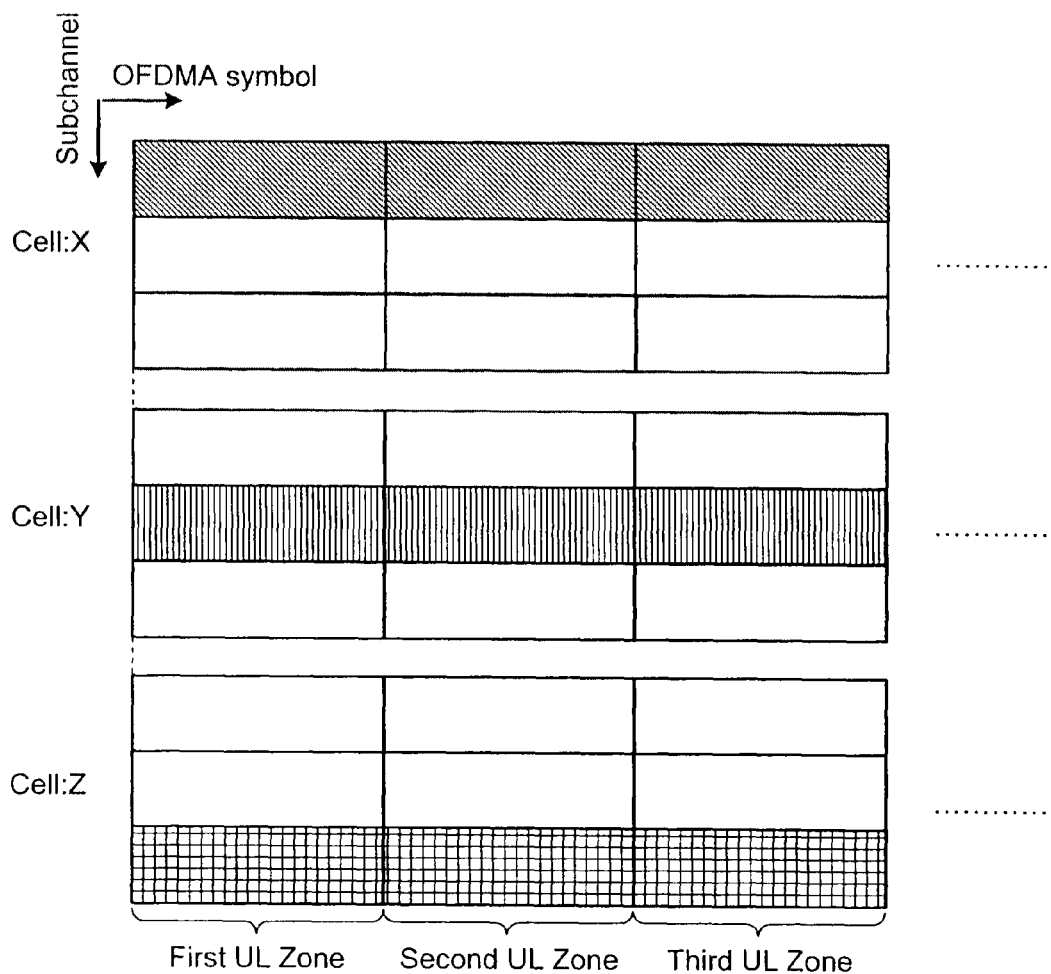
FIG. 11 is a diagram of a configuration example of subchannel groups allocated to each cell in a wireless communication system according to a third embodiment.

As shown in FIG. 11, about ⅓ of the total number of subchannels are allocated as default subchannel groups in the cells X, Y, and Z, respectively.

In a system using PUSC, the base station decides which subchannels are to be used by each of terminals and notifies a result of the determination to each of the terminals. Furthermore, if "UL_PermBase" are set to the same, subcarriers forming each of the subchannels are the same in all UL zones. Therefore, as long as the default subchannel groups are used, interference to other cells does not occur.

Figure 12:
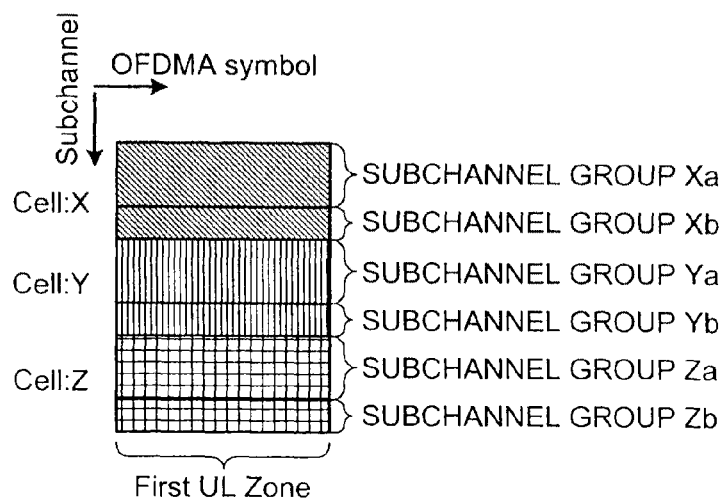
FIG. 12 is a diagram of details of subchannel groups allocated to each cell in the wireless communication system according to the third embodiment.

FIG. 12 is a diagram of a configuration example of the default subchannel groups allocated to each cell. As shown in FIG. 12, the default subchannel groups in each cell are divided into a plurality of segments for a use. The scheduling operation on uplink data is described with reference to FIG. 12. In this example, the scheduling operation on uplink data transmitted in the cell X is described. Similar to the scheduling operation on the downlink data described in the first and the second embodiments, the scheduling operation on uplink data is performed such that scheduling is performed on the uplink data so that effects of interference to other cells are avoided (suppressed). Specifically, uplink data to terminals that cause high-level interference to base stations in other cells (e.g., terminals located at the cell boundary) are allocated to a segment in a lower part of the default subchannel group (a subchannel group Xb in the example shown in FIG. 12).

Figure 13:
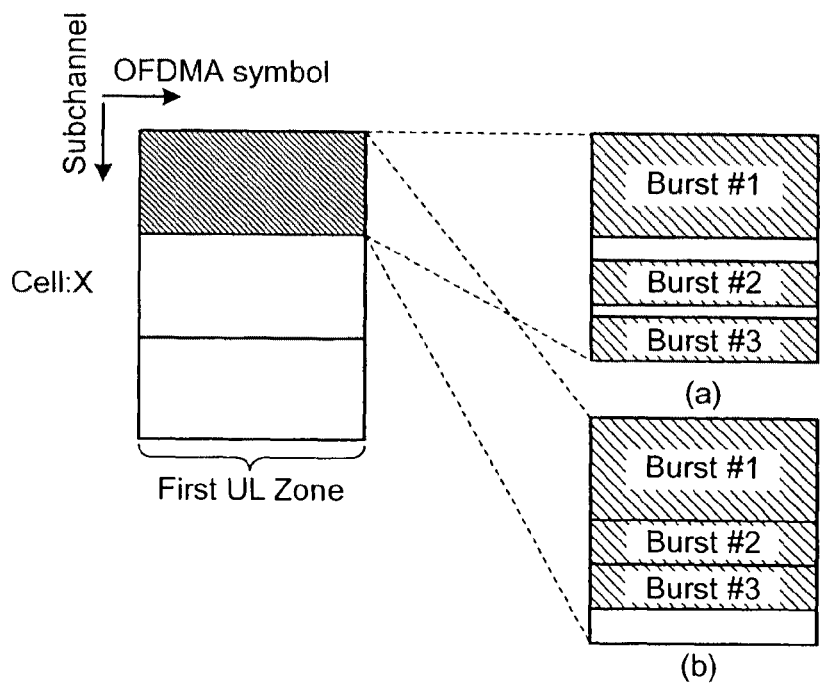
FIG. 13 is a diagram for explaining a scheduling method according to the third embodiment.

Explanations are given below for a reason that the default subchannel group in each cell contains a plurality of segments as in the example shown in FIG. 12. According to the specification (IEEE std 802.16-2004), when a plurality of pieces of uplink data are allocated to a specific segment formed of consecutive subchannels, the base station in each cell is required to allocate uplink data to the specific segment from the top part. For example, as shown in FIG. 13, the following situation is considered: the base station in the cell X allocates all the segments of the default subchannel group as a single segment for allocating uplink data and then schedules (allocates) the uplink data to the single segment. In this case, the base station is not allowed to allocate the uplink data (Burst #1, #2, #3) in the manner as shown in (a) of FIG. 13 while the base station is required to allocate the uplink data in the manner as shown in (b) of FIG. 13.

Figure 14:
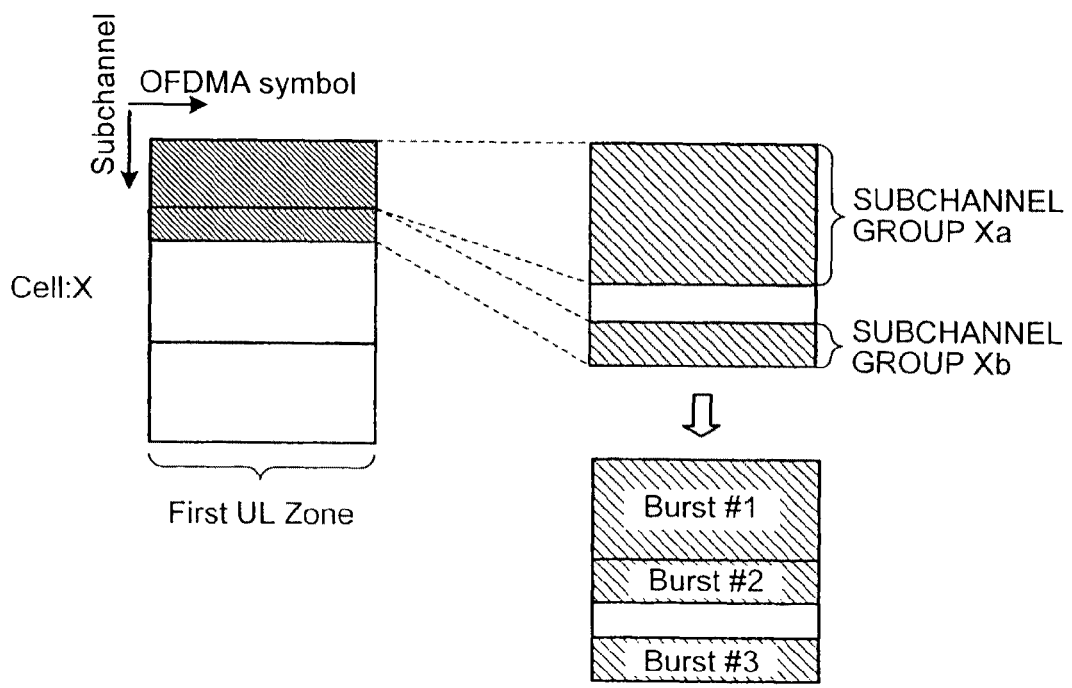
FIG. 14 is a diagram for explaining the scheduling method according to the third embodiment.

Therefore, as shown in FIGS. 12 and 14, the base station divides the default subchannel group into a plurality of segments (two segments in the examples shown in FIGS. 12 and 14) formed of consecutive subchannels. Then, the base station allocates each of divided segments as a segment for allocating uplink data and performs scheduling (allocation) of the uplink data to each of the segments. Thus, even when the scheduling is performed on UL in which uplink data need to be allocated from the top part of the subchannel segments, the uplink data for terminals located at the cell boundary can be allocated to fixed subchannels as shown in FIG. 14.

The default subchannel group is divided by unused subchannels. Specifically, the base station sets a specific segment of the default subchannel group as an unused subchannel segment to divide the default subchannel group into the segments. For example, when the default subchannel group is formed of subchannels #0 to #N, the base station sets the subchannels #0 to #M as the first segment (corresponding to a subchannel group Xa) and sets the subchannels #M+1 and #M+2 as unused subchannel segments. Furthermore, the base station sets the subchannels #M+3 to #N as the second segment (corresponding to the subchannel group Xb).

Figure 15:
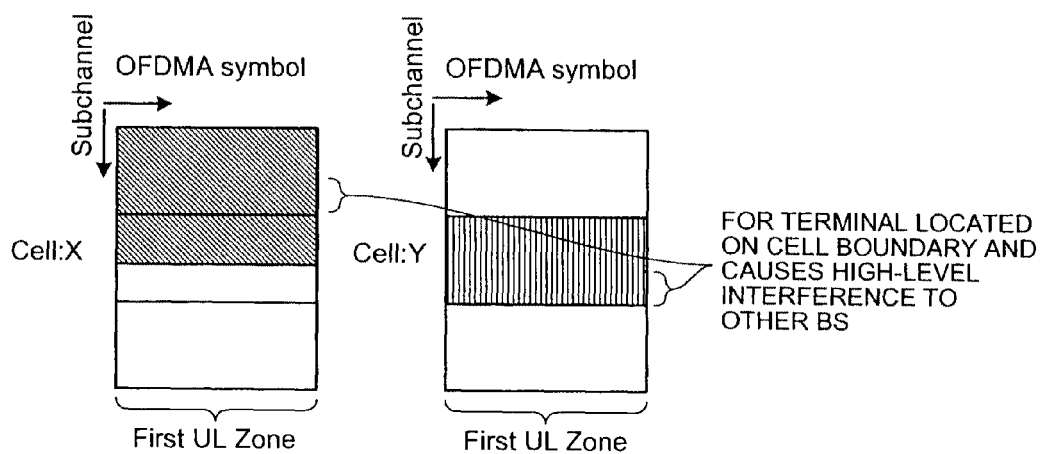
FIG. 15 is a diagram for explaining the scheduling method according to the third embodiment.

When a plurality of pieces of uplink data to be allocated to the UL of the cell X are present, and if all the uplink data cannot be stored in allocated default segments (the default subchannel group allocated to the cell X) shown in FIG. 11, the base station adds a subchannel as shown in FIG. 15 to make it possible to store all the uplink data in the UL.

In this state, the base station adds the same subchannel as that used as the default subchannel group in the cell Y. Specifically, the base station adds the subchannel belonging to a subchannel group Ya shown in FIG. 12. Even after the subchannel group Ya is added, if all the uplink data cannot be stored, the base station adds a subchannel belonging to a subchannel group Za shown in FIG. 12. If all the uplink data cannot be stored still after the subchannel group Za is added, the base station adds a remaining segment (a subchannel belonging to a subchannel group Zb in FIG. 12) that is a subchannel to be used in the cell Z and has not been added in the above processes. If addition of subchannels is still necessary, the base station adds a remaining segment (a subchannel belonging to a subchannel group Yb in FIG. 12) that is a subchannel to be used in the cell Y and has not been added in the above processes. The above processes for adding the subchannels are performed so that the uplink data are allocated from the top part in the subchannel direction (from the top of logical subchannel numbers). Therefore, when the logical subchannel numbers are randomly assigned, it is not necessary to add the subchannels in the above order. Then, uplink data with low transmit power density that hardly causes interference to base stations in other cells are preferentially allocated to the added subchannels.

Figure 16:
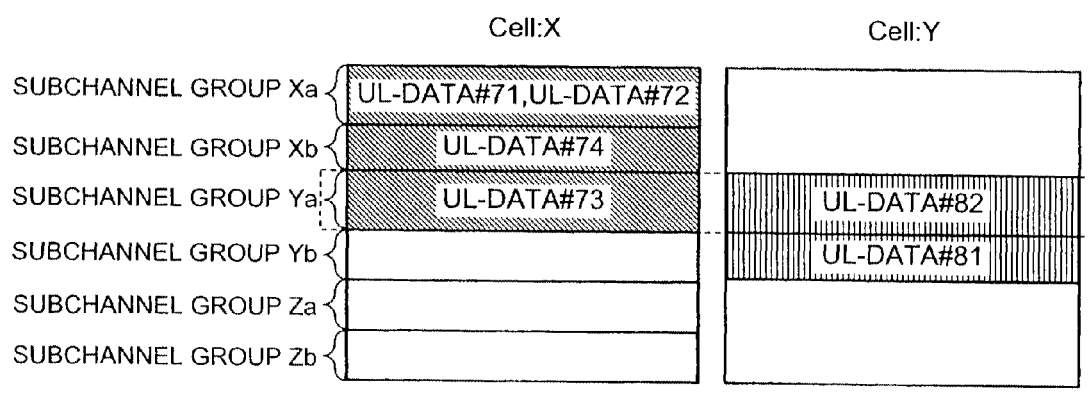
FIG. 16 is a diagram of an example of a result of scheduling obtained when the scheduling method according to the third embodiment is used.

An exemplary operation of scheduling uplink data based on transmit power density is described with reference to FIGS. 8 and 16. FIG. 16 is an example of a result of scheduling performed in the cell X and the cell Y.

In the example shown in FIG. 8, the base station 70 (a scheduling unit of the base station 70) in the cell X allocates to the subchannel group (the subchannel group Xb) on the lower part of the default subchannel group of the cell X uplink data (UL-DATA #74) from the terminal 74 located at the cell boundary (at a boundary of the cell X). Then, the base station 70 allocates to the remaining segments (the default subchannel group) the downlink data from terminals other than the terminal 74. At this state, the base station 70 checks whether all the downlink data from the terminals other than the terminal 74 can be allocated to the remaining segments. If all the downlink data cannot be allocated, the base station 70 allocates to the subchannel group (the subchannel group Ya) on the upper part of the default subchannel group of the cell Y uplink data (UL-DATA #73) from the terminal 73 with the lowest transmit power density. Then, the base station 70 allocates to the remaining segments of the default subchannel group of the cell X the rest of the uplink data.

If all the remaining uplink data cannot be allocated to the remaining segments of the default subchannel group of the cell X after the uplink data (UL-DATA #73) from the terminal 73 is allocated to the default subchannel group of the cell Y, adjustment is conducted such that the uplink data with the second lowest transmit power density to the terminal 73 is allocated to the default subchannel group (the subchannel group Ya) of the cell Y or the default subchannel group (the subchannel group Za) of the cell Z so that all the uplink data can be scheduled.

Similarly, in the cell Y, the base station 80 allocates to the subchannel group (the subchannel group Yb) in the lower part of the default subchannel group of the cell Y uplink data (UL-DATA #81) from the terminal 81 located at the cell boundary. Furthermore, the base station 80 allocates to the remaining segment (the subchannel group Ya) uplink data (UL-DATA #82) from the terminal 82.

In this state, UL-DATA #73 transmitted from the terminal 73 collides with UL-DATA #82 transmitted from the terminal 82 (see FIG. 16). However, a signal transmitted with allocated uplink data from the terminal 82 is sufficiently attenuated when the signal reaches the base station 70 due to propagation attenuation. Therefore, the base station 70 can precisely demodulate data transmitted from the terminal 73 to the base station 70. The base station 80 experiences the same situation in which the base station 80 can precisely demodulate data transmitted from the terminal 82 to the base station 80.

When the base station in the cell X adds the subchannel group Yb and the subchannel group Zb to perform the scheduling, the base station preferentially allocates uplink data with the lowest transmit power density to the subchannel group Yb and the subchannel group Zb (data to terminals near the base station and capable of demodulating the data at low transmit power are preferentially allocated). Then, uplink data with the lowest transmit power density among the remaining uplink data is preferentially allocated to the subchannel group Ya and the subchannel group Za.

In the above explanations, uplink data with high arrival power density to the base stations in the other cells, such as terminals located at the cell boundary, are allocated to the subchannel group (the subchannel group Xb) in the lower part of the default subchannel group of the own cell. When the subchannel group for allocating the uplink data are to be added, the subchannel groups (the subchannel group Ya and the subchannel group Za) in the upper part of the default subchannel groups in the other cells are primarily added. If addition of the subchannels is still necessary, the subchannel groups (the subchannel group Yb and the subchannel group Zb) in the lower part of the default subchannel groups in the other cells are added. However, the above operations can be conducted in a reverse manner. That is, it is possible to set a specific subchannel to be used for data with high arrival power density to the base stations in the other cells. For example, upon performing the operations in the reverse manner, uplink data with high arrival power density to the base stations in the other cells are allocated to the subchannel group Xa. When the subchannel group for allocating the uplink data are to be added, the subchannel groups (the subchannel group Yb and the subchannel group Zb) in the lower part of the default subchannel groups in the other cells are primarily added. If all the uplink data cannot be stored in the default subchannel groups in the other cells, base stations in the cells add the subchannels in the similar manner. Furthermore, in the example shown in FIG. 11, if "UL_PermBase" are the same, the subcarriers forming each of the subchannels are the same in the same cell in all the UL zones. Therefore, the UL zones are not necessarily temporally synchronized with each other. On the other hand, if "UL_PermBase" are different in different UL zones, the UL zone segments need to be temporally the same (in this state, assuming that UL_PermBase of each cell is the same in the same UL zone).

Thus, according to the embodiment, when all the uplink data to be allocated cannot be allocated to the pre-allocated subchannels (the default subchannel groups), the base station sequentially adds the subchannel groups of the default subchannel groups that are preferentially used in the other cells to extend the segment for allocating the uplink data. Then, uplink data with low arrival power density to the base stations in the other cells is preferentially allocated to the added subchannel groups. Therefore, it is possible to improve average throughput while effects of interference to other cells can be suppressed.

Furthermore, the base station is configured to autonomously perform an operation of extending the segment for allocating the uplink data with preset procedures when all the uplink data cannot be allocated. Therefore, it is not necessary to manage subchannels to be allocated between the base stations in a system (it is not necessary to communicate control data between the base stations). Thus, it is possible to suppress interference to other cells and improve average throughput with easy procedures.

INDUSTRIAL APPLICABILITY

As described above, the scheduling method according to the present invention is preferable for a wireless communication system, and more particularly, for a scheduling method in which a base station is capable of preventing occurrence of interference between adjacent cells and realizing high throughput in an OFDMA (Orthogonal Frequency Division Multiple Access)-based wireless communication system.

The invention claimed is:

1. A scheduling method in which a communication apparatus belonging to an OFDMA (Orthogonal Frequency Division Multiple Access)-based wireless communication system communicates data with a plurality of terminals by preferentially allocating a data sequence to a default subchannel segment that is different from another-cell allocation subchannel segment that is preferentially used for data communication by another communication terminal in an adjacent cell, the scheduling method comprising:

a data sequence selection-allocation step including selecting as many data sequences as can be allocated to the default subchannel segment and allocating the selected data sequences to the default subchannel segment, wherein
in downlink scheduling, the data sequence selection-allocation step includes selecting the data sequences in an order based on one or a combination of transmit power density of the data sequences to be transmitted to the plurality of terminals and a positional relationship of each of the plurality of terminals, and
in uplink scheduling, the data sequence selection-allocation step includes selecting the data sequences in an order based on one or a combination of transmit power density of the data sequences to be transmitted by the plurality of terminals and the positional relationship of each of the plurality of terminals; and a remaining data sequence allocation step including allocating a data sequence not allocated to the default subchannel segment to the other-cell allocation subchannel segment when allocation of all the data sequences to the default subchannel segment fails,
wherein
the data sequence selection-allocation step including classifying the selected data sequences into groups and allocating each of the classified groups to different segments in the default subchannel segment, wherein
in the downlink scheduling, the data sequence selection-allocation step including classifying the data sequences based on a level of interference from the adjacent base station, and
in the uplink scheduling, the data sequence selection-allocation step including classifying the data sequences based on a level of interference to the adjacent base station caused by data communication,
the default subchannel segment contains a low-interference data primary allocation segment and a high-interference data primary allocation segment, wherein
the low-interference data primary allocation segment is used for preferentially allocating a data sequence subjected to low interference from the adjacent base station in the downlink scheduling and a data sequence that causes low interference to the adjacent base station because of data transmission in the uplink scheduling, and
the high-interference data primary allocation segment is used for preferentially allocating a data sequence subjected to high interference from the adjacent base station in the downlink scheduling and a data sequence that causes high interference to the adjacent base station because of data transmission in the uplink scheduling, and
the data sequence selection-allocation step including allocating a group of data sequences among the selected data sequences to the low-interference data primary allocation segment and the high-interference data primary allocation segment in the default subchannel segment, wherein
the low-interference data primary allocation segment is used for allocating a group containing a data sequence subjected to lowest interference from the adjacent base station in the downlink scheduling and a group containing a data sequence that causes lowest interference to the adjacent base station because of data transmission in the uplink scheduling, and
the high-interference data primary allocation segment is used for allocating a group containing a data sequence subjected to highest interference from the adjacent base station in the downlink scheduling and a group containing a data sequence that causes highest interference to the adjacent base station because of data transmission in the uplink scheduling.

2. The scheduling method according to claim 1, wherein the other-cell allocation subchannel segment contains an other-cell low-interference data primary allocation segment and an other-cell high-interference data primary allocation segment, wherein
the other-cell low-interference data primary allocation segment is used for preferentially allocating a data sequence subjected to low interference from the adjacent base station in the downlink scheduling and a data sequence that causes low interference to the adjacent base station because of data transmission in the uplink scheduling, and
the other-cell high-interference data primary allocation segment is used for preferentially allocating a data sequence subjected to high interference from the adjacent base station in the downlink scheduling and a data sequence that causes high interference to the adjacent base station because of data transmission in the uplink scheduling, and
the remaining data sequence allocation step including allocating a data sequence that has not been allocated to the default subchannel segment to the other-cell low-interference data primary allocation segment of the other-cell allocation subchannel segment.

3. The scheduling method according to claim 2, wherein the level of interference to the adjacent base station is determined based on one or a combination of the transmit power density of the data sequences to be transmitted by the plurality of terminals and the positional relationship of each of the plurality of terminals.

4. The scheduling method according to claim 2, wherein the level of interference from the adjacent base station is determined based on one or a combination of transmit power density of the data sequences to be transmitted to the plurality of terminals and the positional relationship of each of the plurality of terminals.

5. A scheduling method in which a communication apparatus belonging to an OFDMA (Orthogonal Frequency Division Multiple Access)-based wireless communication system communicates data with a plurality of terminals by preferentially allocating a data sequence to a default subchannel segment that is different from another-cell allocation subchannel segment that is preferentially used for data communication by another communication terminal in an adjacent cell, the scheduling method comprising:

a data sequence selection-allocation step including selecting as many data sequences as can be allocated to the default subchannel segment and allocating the selected data sequences to the default subchannel segment, wherein in downlink scheduling, the data sequence selection-allocation step includes selecting the data sequences in an order based on one or a combination of transmit power density of the data sequences to be transmitted to the plurality of terminals and a positional relationship of each of the plurality of terminals, and in uplink scheduling, the data sequence selection-allocation step includes selecting the data sequences in an order based on one or a combination of transmit power density of the data sequences to be transmitted by the plurality of terminals and the positional relationship of each of the plurality of terminals; and a remaining data sequence allocation step including allocating a data sequence not allocated to the default subchannel segment to the other-cell allocation subchannel segment when allocation of all the data sequences to the default subchannel segment fails, wherein the other-cell allocation subchannel segment contains an other-cell low-interference data primary allocation segment and an other-cell high-interference data primary allocation segment, wherein the other-cell low-interference data primary allocation segment is used for preferentially allocating a data sequence subjected to low interference from the adjacent base station in the downlink scheduling and a data sequence that causes low interference to the adjacent base station because of data transmission in the uplink scheduling, and the other-cell high-interference data primary allocation segment is used for preferentially allocating a data sequence subjected to high interference from the adjacent base station in the downlink scheduling and a data sequence that causes high interference to the adjacent base station because of data transmission in the uplink scheduling, and the remaining data sequence allocation step including allocating a data sequence that has not been allocated to the default subchannel segment to the other-cell low-interference data primary allocation segment of the other-cell allocation subchannel segment.

6. A communication apparatus configured to communicate data with a plurality of terminals in an OFDMA (Orthogonal Frequency Division Multiple Access)-based wireless communication system by preferentially allocating a data sequence to a default subchannel segment that is different from another-cell allocation subchannel segment that is preferentially used for data communication by another communication terminal in an adjacent cell, the communication apparatus comprising:

a first scheduling unit configured to select as many data sequences as can be allocated to the default subchannel segment and to allocate the selected data sequences to the default subchannel segment, wherein in downlink scheduling, the first scheduling unit selects the data sequences in an order based on one or a combination of transmit power density of the data sequences to be transmitted to the plurality of terminals and a positional relationship of each of the plurality of terminals, and in uplink scheduling, the first scheduling unit selects the data sequences in an order based on one or a combination of transmit power density of the data sequences to be transmitted by the plurality of terminals and the positional relationship of each of the plurality of terminals;

a second scheduling unit configured to allocate a data sequence not allocated to the default subchannel segment to the other-cell allocation subchannel segment when the first scheduling unit fails to allocate all the data sequences to the default subchannel segment; and a mapping unit configured to perform mapping on the data sequences based on results of scheduling performed by the first scheduling unit and the second scheduling unit, wherein the first scheduling unit is configured to classify the selected data sequences into groups and to allocate each of the classified groups to different segments in the default subchannel segment, wherein in the downlink scheduling, the first scheduling unit classifies the data sequences based on a level of interference from the adjacent base station, and in the uplink scheduling, the first scheduling unit classifies the data sequences based on a level of interference to the adjacent base station caused by data communication, the default subchannel segment contains a low-interference data primary allocation segment and a high-interference data primary allocation segment, wherein the low-interference data primary allocation segment is used for preferentially allocating a data sequence subjected to low interference from the adjacent base station in the downlink scheduling and a data sequence that causes low interference to the adjacent base station because of data transmission in the uplink scheduling, and the high-interference data primary allocation segment is used for preferentially allocating a data sequence subjected to high interference from the adjacent base station in the downlink scheduling and a data sequence that causes high interference to the adjacent base station because of data transmission in the uplink scheduling, and the first scheduling unit is configured to allocate a group of data sequences among the selected data sequences to the low-interference data primary allocation segment and the high-interference data primary allocation segment in the default subchannel segment, wherein the low-interference data primary allocation segment is used for allocating a group containing a data sequence subjected to lowest interference from the adjacent base station in the downlink scheduling and a group containing a data sequence that causes lowest interference to the adjacent base station because of data transmission in the uplink scheduling, and the high-interference data primary allocation segment is used for allocating a group containing a data sequence subjected to highest interference from the adjacent base station in the downlink scheduling and a group containing a data sequence that causes highest interference to the adjacent base station because of data transmission in the uplink scheduling.

7. The communication apparatus according to claim 6, wherein
the other-cell allocation subchannel segment contains an other-cell low-interference data primary allocation segment and an other-cell high-interference data primary allocation segment, wherein
the other-cell low-interference data primary allocation segment is used for preferentially allocating a data sequence subjected to low interference from the adjacent base station in the downlink scheduling and a data sequence that causes low interference to the adjacent base station because of data transmission in the uplink scheduling, and
the other-cell high-interference data primary allocation segment is used for preferentially allocating a data sequence subjected to high interference from the adjacent base station in the downlink scheduling and a data sequence that causes high interference to the adjacent base station because of data transmission in the uplink scheduling, and
the second scheduling unit is configured to allocate a data sequence that has not been allocated to the default subchannel segment to the other-cell low-interference data primary allocation segment of the other-cell allocation subchannel segment.

8. The communication apparatus according to claim 7, wherein the level of interference to the adjacent base station is determined based on one or a combination of the transmit power density of the data sequences to be transmitted by the plurality of terminals and the positional relationship of each of the plurality of terminals.

9. The communication apparatus according to claim 7, wherein the level of interference from the adjacent base station is determined based on one or a combination of transmit power density of the data to be transmitted to the plurality of terminals and the positional relationship of each of the plurality of terminals.

10. A communication apparatus configured to communicate data with a plurality of terminals in an OFDMA (Orthogonal Frequency Division Multiple Access)-based wireless communication system by preferentially allocating a data sequence to a default subchannel segment that is different from another-cell allocation subchannel segment that is preferentially used for data communication by another communication terminal in an adjacent cell, the communication apparatus comprising:

a first scheduling unit configured to select as many data sequences as can be allocated to the default subchannel segment and to allocate the selected data sequences to the default subchannel segment, wherein
in downlink scheduling, the first scheduling unit selects the data sequences in an order based on one or a combination of transmit power density of the data sequences to be transmitted to the plurality of terminals and a positional relationship of each of the plurality of terminals, and
in uplink scheduling, the first scheduling unit selects the data sequences in an order based on one or a combination of transmit power density of the data sequences to be transmitted by the plurality of terminals and the positional relationship of each of the plurality of terminals;
a second scheduling unit configured to allocate a data sequence not allocated to the default subchannel segment to the other-cell allocation subchannel segment when the first scheduling unit fails to allocate all the data sequences to the default subchannel segment; and
a mapping unit configured to perform mapping on the data sequences based on results of scheduling performed by the first scheduling unit and the second scheduling unit, wherein
the other-cell allocation subchannel segment contains an other-cell low-interference data primary allocation segment and an other-cell high-interference data primary allocation segment, wherein
the other-cell low-interference data primary allocation segment is used for preferentially allocating a data sequence subjected to low interference from the adjacent base station in the downlink scheduling and a data sequence that causes low interference to the adjacent base station because of data transmission in the uplink scheduling, and
the other-cell high-interference data primary allocation segment is used for preferentially allocating a data sequence subjected to high interference from the adjacent base station in the downlink scheduling and a data sequence that causes high interference to the adjacent base station because of data transmission in the uplink scheduling, and
the second scheduling unit is configured to allocate a data sequence that has not been allocated to the default subchannel segment to the other-cell low-interference data primary allocation segment of the other-cell allocation subchannel segment.

* * * * *